US009584675B2

(12) United States Patent
Kitao

(10) Patent No.: US 9,584,675 B2
(45) Date of Patent: Feb. 28, 2017

(54) IMAGE PROCESSING APPARATUS, COMMUNICATION CONDITION SETTING METHOD

(71) Applicant: KYOCERA Document Solutions Inc., Osaka-shi, Osaka (JP)

(72) Inventor: Tomoyuki Kitao, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/930,502

(22) Filed: Nov. 2, 2015

(65) Prior Publication Data

US 2016/0127575 A1 May 5, 2016

(30) Foreign Application Priority Data

Nov. 4, 2014 (JP) ................................. 2014-224540

(51) Int. Cl.
| | |
|---|---|
| H04N 1/00 | (2006.01) |
| G06F 3/12 | (2006.01) |
| G06K 15/02 | (2006.01) |
| H04W 72/02 | (2009.01) |
| H04W 72/04 | (2009.01) |
| H04W 72/12 | (2009.01) |

(52) U.S. Cl.
CPC ....... *H04N 1/00106* (2013.01); *H04N 1/0001* (2013.01); *H04N 1/00034* (2013.01); *H04N 1/00037* (2013.01); *H04N 1/00307* (2013.01); *H04W 72/02* (2013.01); *H04N 2201/0094* (2013.01); *H04W 72/1226* (2013.01)

(58) Field of Classification Search
None
See application file for complete search history.

(56) References Cited

U.S. PATENT DOCUMENTS

| | | | |
|---|---|---|---|
| 8,254,296 B1* | 8/2012 | Lambert | H04W 72/02 370/281 |
| 2006/0072502 A1 | 4/2006 | Crandall et al. | |
| 2006/0126531 A1 | 6/2006 | Myojo et al. | |
| 2007/0026810 A1* | 2/2007 | Love | H04B 7/063 455/67.11 |

(Continued)

FOREIGN PATENT DOCUMENTS

| | | |
|---|---|---|
| JP | 2006173678 A | 6/2006 |
| JP | 2007208853 A | 8/2007 |
| WO | 2008001728 A1 | 1/2008 |

*Primary Examiner* — Beniyam Menberu
(74) *Attorney, Agent, or Firm* — Alleman Hall McCoy Russell & Tuttle LLP

(57) ABSTRACT

An image processing apparatus includes a speed detecting portion and a communication condition setting portion. The speed detecting portion performs wireless communications with a communication device in a plurality of predetermined frequency bands and detects communication speeds of the wireless communications that respectively correspond to the plurality of predetermined frequency bands. The communication condition setting portion sets a frequency band that corresponds to a highest communication speed among the communication speeds detected by the speed detecting portion, as a communication frequency band to be used in wireless communications that are performed to transmit and receive image data to/from the communication device.

5 Claims, 3 Drawing Sheets

(56) References Cited

U.S. PATENT DOCUMENTS

| | | | |
|---|---|---|---|
| 2010/0315954 A1* | 12/2010 | Singh | H04W 72/044 370/241 |
| 2012/0147777 A1* | 6/2012 | Arashin | H04W 72/02 370/252 |
| 2012/0269142 A1 | 10/2012 | Porat et al. | |
| 2013/0072246 A1* | 3/2013 | Nobukiyo | H04W 72/08 455/512 |
| 2013/0089054 A1 | 4/2013 | Hansen et al. | |
| 2013/0258962 A1* | 10/2013 | Oota | H04W 72/10 370/329 |
| 2014/0177548 A1* | 6/2014 | Aihara | H04W 72/02 370/329 |
| 2015/0105121 A1* | 4/2015 | Emmanuel | H04W 28/0215 455/553.1 |
| 2016/0029248 A1* | 1/2016 | Syed | H04W 28/08 370/235 |
| 2016/0057713 A1* | 2/2016 | Zhang | H04W 52/386 455/418 |

* cited by examiner

IMAGE PROCESSING APPARATUS, COMMUNICATION CONDITION SETTING METHOD

INCORPORATION BY REFERENCE

This application is based upon and claims the benefit of priority from the corresponding Japanese Patent Application No. 2014-224540 filed on Nov. 4, 2014, the entire contents of which are incorporated herein by reference.

BACKGROUND

The present disclosure relates to an image processing apparatus configured to perform a wireless communication with a communication device, and relates to a communication condition setting method.

In general, there is known an image processing apparatus such as a printer that can perform a wireless communication with a communication device such as a mobile terminal.

Here, a communication frequency band used in the wireless communications by the image processing apparatus may overlap with a frequency band used by another electronic device that is present in the surroundings of the image processing apparatus. In that case, the image processing apparatus may be interfered with an electromagnetic wave emitted from the other electronic device, and the communication speed of the wireless communication performed by the image processing apparatus may be reduced. For example, when the communication frequency band used by the image processing apparatus is a 2.4 GHz frequency band called an ISM band, the communication frequency band is likely to overlap with the frequency band of the other electronic device.

On the other hand, there is known an image processing apparatus in which the communication frequency band can be selected from a plurality of frequency bands. For example, there is known an image processing apparatus in which either the 2.4 GHz frequency band or the 5 GHz frequency band can be selected as the communication frequency band. This makes it possible to avoid an overlapping of the communication frequency band with the frequency band of the other electronic device.

SUMMARY

An image processing apparatus according to an aspect of the present disclosure includes a speed detecting portion and a communication condition setting portion. The speed detecting portion performs wireless communications with a communication device in a plurality of predetermined frequency bands and detects communication speeds of the wireless communications that respectively correspond to the plurality of predetermined frequency bands. The communication condition setting portion sets a frequency band that corresponds to a highest communication speed among the communication speeds detected by the speed detecting portion, as a communication frequency band to be used in wireless communications that are performed to transmit and receive image data to/from the communication device.

A communication condition setting method according to another aspect of the present disclosure includes a first step and a second step. In the first step, wireless communications are performed with a communication device in a plurality of predetermined frequency bands and communication speeds of the wireless communications that respectively correspond to the plurality of predetermined frequency bands are detected. In the second step, a frequency band that corresponds to a highest communication speed among the communication speeds detected in the first step, is set as a communication frequency band to be used in wireless communications that are performed to transmit and receive image data to/from the communication device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following embodiment is an example of a specific embodiment of the present disclosure and should not limit the technical scope of the disclosure.

[Communication System 100]

Figure 1:
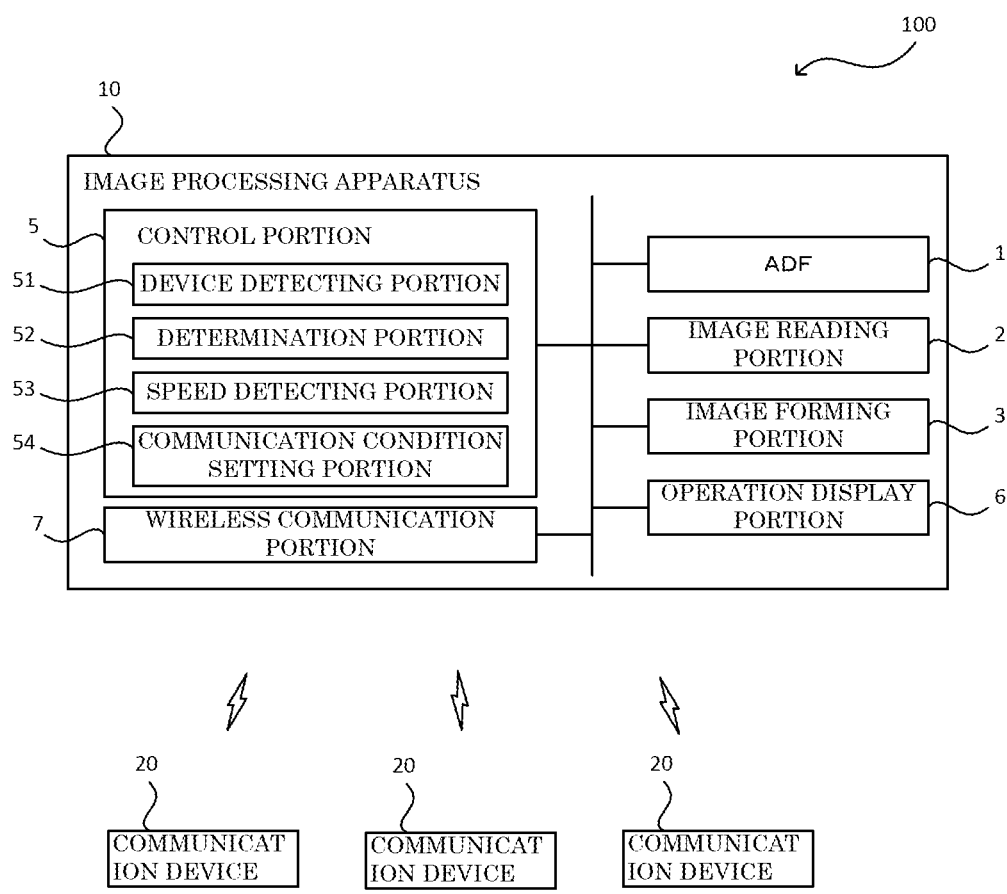
FIG. 1 is a block diagram showing the configuration of a communication system including an image processing apparatus according to an embodiment of the present disclosure.

As shown in FIG. 1, a communication system 100 including an image processing apparatus 10 according to an embodiment of the present disclosure includes the image processing apparatus 10 and a plurality of communication devices 20. Each of the communication devices 20 is a mobile terminal such as a smartphone and can perform wireless data communications with the image processing apparatus 10.

[Outlined Configuration of Image Processing Apparatus 10]

First, an outlined configuration of the image processing apparatus 10 according to an embodiment of the present disclosure is described with reference to FIG. 1 and FIG. 2. Here, FIG. 2 is a schematic cross-sectional view showing the configuration of the image processing apparatus 10.

Figure 2:
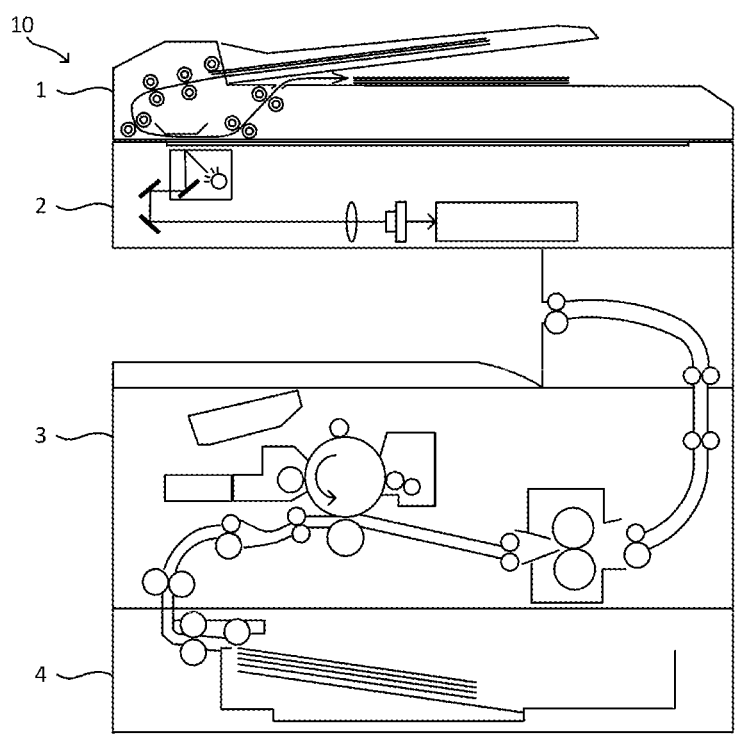
FIG. 2 is a diagram showing the configuration of the image processing apparatus according to an embodiment of the present disclosure.

As shown in FIG. 1 and FIG. 2, the image processing apparatus 10 includes an ADF 1, an image reading portion 2, an image forming portion 3, a sheet feed portion 4, a control portion 5, an operation display portion 6, and a wireless communication portion 7. The image processing apparatus 10 is a multifunction peripheral having a plurality of functions such as a scan function, a facsimile function, or a copy function, as well as a print function to form an image based on image data. In addition, the present disclosure is applicable to an image processing apparatus such as a printer apparatus, a scanner apparatus, a facsimile apparatus, and a copier.

The ADF 1 is an automatic document feeding device which includes a document sheet setting portion, a plurality of conveying rollers, a document sheet pressing, and a sheet discharge portion, and conveys a document sheet in such a way as to be read by the image reading portion 2. The image reading portion 2 includes a document sheet table, a light source, a plurality of mirrors, an optical lens, and a CCD (Charge Coupled Device), and is configured to execute an image reading process of reading image data from a document sheet that is placed on the document sheet table or from a document sheet that is conveyed by the ADF 1.

The image forming portion 3 is configured to form an image by the electrophotography based on image data which has been read by the image reading portion 2, or based on image data input from an external information processing apparatus such as a personal computer. Specifically, the image forming portion 3 includes a photoconductor drum, a charging device, an optical scanning device (LSU), a developing device, a transfer roller, a cleaning device, a fixing roller, a pressure roller, and a sheet discharge tray. In the image forming portion 3, an image is formed on a sheet that is supplied from the sheet feed portion 4, and the sheet with the image formed thereon is discharged onto the sheet discharge tray. It is noted that the sheet is a sheet-like material such as a sheet of paper, a sheet of coated paper, a postcard, an envelope, or an OHP sheet.

The control portion 5 includes control equipment such as CPU, ROM, RAM, and EEPROM that are not shown. The CPU is a processor for executing various types of calculation processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 5 comprehensively controls the image processing apparatus 10 by executing the various types of control programs stored in advance in the ROM, by using the CPU. It is noted that the control portion 5 may be formed as an electronic circuit such as an integrated circuit (ASIC), and may be a control portion provided independently of a main control portion that comprehensively controls the image processing apparatus 10.

The operation display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations.

The wireless communication portion 7 is a communication interface configured to perform wireless communications with the communication devices 20. For example, the wireless communication portion 7 is configured to transmit and receive image data to/from the communication devices 20 by performing wireless communications in accordance with a wireless LAN communication standard such as IEEE 802.11n.

Here, a communication frequency band used in the wireless communications by the image processing apparatus 10 may overlap with a frequency band used by another electronic device that is present in the surroundings of the image processing apparatus 10. In that case, the image processing apparatus 10 may be interfered with an electromagnetic wave emitted from the other electronic device, and the communication speed of the wireless communication performed by the image processing apparatus 10 may be reduced. For example, when the communication frequency band used by the image processing apparatus 10 is a 2.4 GHz frequency band called an ISM band, the communication frequency band is likely to overlap with the frequency band of the other electronic device. On the other hand, according to the image processing apparatus 10, it is possible to select the communication frequency band from among a plurality of frequency bands.

Specifically, the wireless communication portion 7 can perform wireless communications with the communication devices 20 in the communication frequency band selected from among a plurality of predetermined frequency bands. For example, the wireless communication portion 7 can perform wireless communications with the communication devices 20 in accordance with the IEEE 802.11n communication standard in the communication frequency band selected from the 2.4 GHz band and a 5 GHz band by a user operation. This makes it possible to avoid an overlapping of the communication frequency band with the frequency band of the other electronic device.

It is noted that the wireless communication portion 7 may perform wireless communications in accordance with a communication standard other than the IEEE 802.11n as far as it allows the communication frequency band for the wireless communications with the communication devices 20 to be selected from among a plurality of frequency bands. In addition, the wireless communication portion 7 may perform wireless communications in the communication frequency band selected from two or more frequency bands that include either or both of the 2.4 GHz band and the 5 GHz band. Furthermore, the wireless communication portion 7 may perform wireless communications in the communication frequency band selected from a plurality of frequency bands that do not include any of the 2.4 GHz band and the 5 GHz band.

Meanwhile, the factor that affects the communication speed in the wireless communications between the image processing apparatus 10 and the communication devices 20 is not limited to the overlapping of the communication frequency band with the frequency band of other electronic device(s). For example, the communication speed of a wireless communication between the image processing apparatus 10 and a communication device 20 is affected by the distance therebetween and the presence or absence of an obstacle. As a result, if the settings of the communication frequency band are changed not to overlap with the frequency band of the other electronic device(s), it may happen that the communication speed is reduced on the contrary. On the other hand, as described below, the image processing apparatus 10 can restrict the reduction of the communication speed that would occur due to the communication environment of the wireless communications with the communication devices 20.

Figure 3:
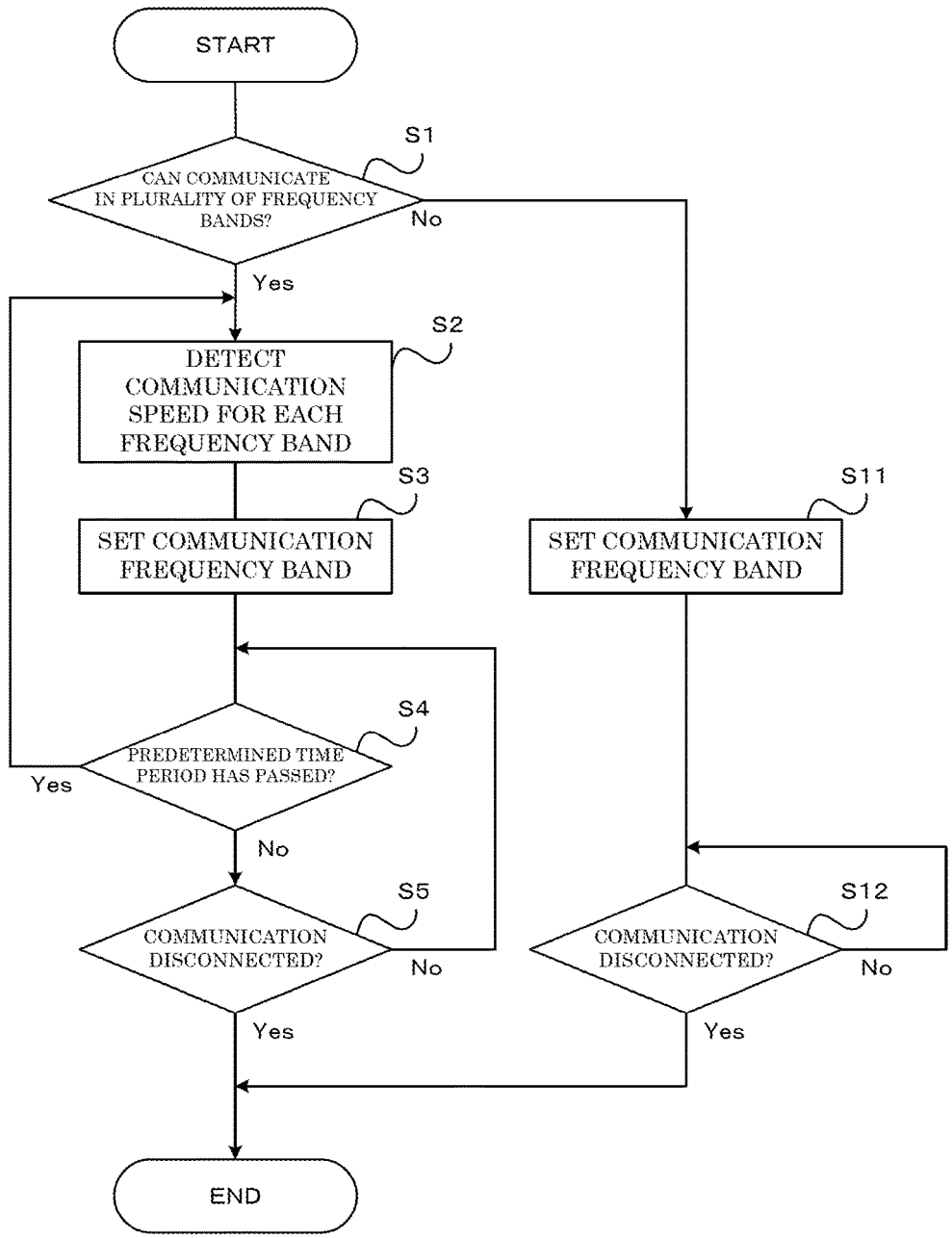
FIG. 3 is a flowchart showing an example of a communication condition setting process executed by the image processing apparatus according to an embodiment of the present disclosure.

Specifically, a communication condition setting program is stored in the ROM of the control portion 5 in advance, wherein the communication condition setting program causes the CPU to execute a communication condition setting process that is described below (see FIG. 3). It is noted that the communication condition setting program may be recorded on a computer-readable recording medium such as a CD, a DVD, or a flash memory and installed from the recording medium onto a storage portion such as the EEPROM of the control portion 5.

As shown in FIG. 1, the control portion 5 includes a device detecting portion 51, a determination portion 52, a speed detecting portion 53, and a communication condition setting portion 54. Specifically, the control portion 5 functions as the device detecting portion 51, the determination portion 52, the speed detecting portion 53, and the communication condition setting portion 54 when it executes, by using the CPU, the communication condition setting program stored in the ROM.

The device detecting portion 51 detects the communication devices 20 that are present within a predetermined communication range. For example, the device detecting portion 51 controls the wireless communication portion 7 to transmit a beacon signal at regular intervals to the surroundings of the image processing apparatus 10. The device detecting portion 51 further controls the wireless communication portion 7 to receive connection requests that are transmitted from the communication devices 20 in response to the beacon signal. This enables the device detecting portion 51 to detect the communication devices 20.

Here, the device detecting portion 51 transmits the beacon signal in a plurality of frequency bands that can be used as the communication frequency band by the wireless communication portion 7. For example, the device detecting portion 51 transmits the beacon signal alternately in the 2.4 GHz band and the 5 GHz band. With this configuration, the device detecting portion 51 can detect the communication devices 20 that can use only the 2.4 GHz frequency band, as well as the communication devices 20 that can use both the 2.4 GHz frequency band and the 5 GHz frequency band. It is noted that a range in which the wireless communication portion 7 can communicate with the communication devices 20 in accordance with the IEEE 802.11n communication standard is an example of the predetermined communication range of the present disclosure.

The determination portion 52 determines whether or not the communication device 20 detected by the device detecting portion 51 can communicate in a plurality of frequency bands that can be used as the communication frequency band by the wireless communication portion 7. For example, the control portion 5 determines whether or not the communication device 20 can communicate in both the 2.4 GHz frequency band and the 5 GHz frequency band by referencing information which indicates communication frequency bands in which the communication device 20 can communicate, wherein the information is included in the connection request received from the communication device 20. It is noted that the control portion 5 may determine that the communication device 20 can communicate in both the 2.4 GHz frequency band and the 5 GHz frequency band when it receives both: a connection request sent in response to the beacon transmitted in the 2.4 GHz band; and a connection request sent in response to the beacon transmitted in the 5 GHz band.

The speed detecting portion 53 performs wireless communications with the communication devices 20 in a plurality of frequency bands that can be used as the communication frequency band by the wireless communication portion 7, and detects communication speeds of the wireless communications that respectively correspond to the frequency bands. For example, the speed detecting portion 53 performs wireless communications with the communication devices 20 detected by the device detecting portion 51, in the 2.4 GHz band and in the 5 GHz band, and detects the communication speeds of the wireless communications that respectively correspond to the 2.4 GHz band and the 5 GHz band. It is noted that the speed detecting portion 53 does not detect a communication speed when a communication device 20 detected by the device detecting portion 51 can communicate only in the 2.4 GHz frequency band.

In addition, the speed detecting portion 53 detects communication speeds of the wireless communications performed in the frequency bands, at predetermined detection intervals. For example, the speed detecting portion 53 may detect the communication speeds each time a predetermined time period passes or each time a predetermined time comes.

The communication condition setting portion 54 sets a frequency band that corresponds to the highest communication speed among the communication speeds detected by the speed detecting portion 53, as the communication frequency band to be used in the wireless communications that are performed to transmit and receive image data to/from the communication devices 20.

Here, the communication condition setting portion 54 sets the communication frequency band for each of the communication devices 20 detected by the device detecting portion 51. It is noted that when the communication device 20 detected by the device detecting portion 51 can communicate only in the 2.4 GHz band, the communication condition setting portion 54 sets, as the communication frequency band, the frequency band in which the communication device 20 can communicate.

In addition, the communication condition setting portion 54 sets the communication frequency band of the communication devices 20 at each interval of detection.

[Communication Condition Setting Process]

The following describes an example of the procedure of the communication condition setting process that is executed in accordance with the communication condition setting program by the control portion 5 in the image processing apparatus 10. Here, steps S1, S2, . . . represent numbers of the processing procedures (steps) executed by the control portion 5. It is noted that the control portion 5 executes the communication condition setting process each time the device detecting portion 51 detects a communication device 20.

<Step S1>

First, in step S1, the control portion 5 determines whether or not the communication device 20 detected by the device detecting portion 51 can communicate in both the 2.4 GHz frequency band and the 5 GHz frequency band. Here, the process of step S1 is executed by the determination portion 52 of the control portion 5.

Here, upon determining that the communication device 20 can communicate in both the 2.4 GHz frequency band and the 5 GHz frequency band (Yes in S1), the control portion 5 moves the process to step S2. In addition, upon determining that the communication device 20 cannot communicate in both the 2.4 GHz frequency band and the 5 GHz frequency band (No in S1), the control portion 5 moves the process to step S11.

<Step S11>

In step S11, the control portion 5 sets, as the communication frequency band, the frequency band that is used in the wireless communication by the communication device 20 detected by the device detecting portion 51. Here, the process of step S11 is executed by the communication condition setting portion 54 of the control portion 5.

<Step S12>

In step S12, the control portion 5 determines whether or not the wireless communication with the communication device 20 has been disconnected.

Here, upon determining that the wireless communication with the communication device 20 has been disconnected (Yes in S12), the control portion 5 ends the communication condition setting process. In addition, upon determining that the wireless communication with the communication device 20 has not been disconnected (No in S12), the control portion 5 waits for a disconnection of the wireless communication with the communication device 20 in step S12.

<Step S2>

On the other hand, in step S2, the control portion 5 performs wireless communications with the communication device 20 detected by the device detecting portion 51, in the 2.4 GHz frequency band and the 5 frequency GHz band, and detects the communication speeds of the wireless communications that respectively correspond to the 2.4 GHz band and the 5 GHz band. Here, the process of step S2 is an example of the first step of the present disclosure and is executed by the speed detecting portion 53 of the control portion 5.

<Step S3>

In step S3, the control portion 5 sets a frequency band that corresponds to the highest communication speed among the communication speeds detected in step S2, as the communication frequency band to be used in wireless communications performed to transmit and receive image data to/from the communication device 20. Here, the process of step S3 is an example of the second step of the present disclosure and is executed by the communication condition setting portion 54 of the control portion 5. With this configuration, a frequency band of the highest communication speed can be automatically selected as the communication frequency band, based on the communication environment of the wireless communications that were performed between the image processing apparatus 10 and the communication device 20 in the process of step S2.

<Step S4>

In step S4, the control portion 5 determines whether or not a predetermined time period corresponding to the detection interval has passed since the execution of the process of step S2.

Here, upon determining that the predetermined time period has passed (Yes in S4), the control portion 5 returns the process to step S2, and executes the processes of step S2 and step S3 again. With this configuration, even when the communication environment in the wireless communication between the image processing apparatus 10 and the communication device 20 has changed with time, a frequency band of the highest communication speed at the time can be selected as the communication frequency band. Here, in the case where the communication device 20 is a mobile terminal, the communication frequency band can be selected in response to an environmental change of the communication due to movement of the user carrying the mobile terminal. Meanwhile, upon determining that the predetermined time period has not passed (No in S4), the control portion 5 moves the process to step S5.

<Step S5>

In step S5, the control portion 5 determines whether or not the wireless communication with the communication device 20 has been disconnected.

Here, upon determining that the wireless communication with the communication device 20 has been disconnected (Yes in S5), the control portion 5 ends the communication condition setting process. In addition, upon determining that the wireless communication with the communication device 20 has not been disconnected (No in S5), the control portion 5 returns the process to step S4 and waits for the predetermined time period to pass or waits for a disconnection of the wireless communication with the communication device 20.

As described above, in the communication condition setting process, the communication frequency band is set to a frequency band of the highest communication speed among the communication speeds that respectively correspond to the 2.4 GHz band and the 5 GHz band in which the wireless communications were performed with the communication device 20. This makes it possible to restrict the reduction of the communication speed that would be caused by the communication environment in the wireless communication with the communication device 20.

In addition, in the communication condition setting process, the communication frequency band is set for each of the communication devices 20 detected by the device detecting portion 51. As a result, it is possible to set an appropriate communication frequency band for each of the wireless communications that are performed with the communication devices 20 in different communication environments.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   a speed detecting portion, executed on a processor, configured to perform wireless communications with a communication device in a plurality of predetermined frequency bands and detect communication speeds of the wireless communications that respectively correspond to the plurality of predetermined frequency bands;
   a communication condition setting portion, executed on the processor, configured to set a frequency band that corresponds to a highest communication speed among the communication speeds detected by the speed detecting portion, as a communication frequency band to be used in wireless communications that are performed to transmit and receive image data to/from the communication device; and
   a device detecting portion, executed on the processor, configured to detect communication devices that are present in a predetermined communication range, wherein
   the device detecting portion transmits a beacon signal at regular time intervals to surroundings of the image processing apparatus so as to detect the communication devices that are present in the predetermined communication range;
   the speed detecting portion detects, at predetermined detection time intervals, communication speeds that respectively correspond to the plurality of predetermined frequency bands, and does not detect a communication speed when a communication device detected by the device detecting portion can communicate only in one frequency band; and
   the communication condition setting portion sets the communication frequency band for each of the communication devices detected by the device detecting portion, and sets the communication frequency band at the predetermined detection time intervals.

2. The image processing apparatus according to claim 1, wherein
   the communication device is a mobile terminal.

3. The image processing apparatus according to claim 1, wherein the plurality of predetermined frequency bands include a 2.4 GHz band and a 5 GHz band.

4. The image processing apparatus according to claim 1 further comprising
either or both of: an image reading portion configured to read image data from a document sheet; and an image forming portion configured to form an image based on image data.

5. A communication condition setting method comprising:
a first step of, with a processor, performing wireless communications with a communication device in a plurality of predetermined frequency bands and detecting communication speeds of the wireless communications that respectively correspond to the plurality of predetermined frequency bands;
a second step of, with the processor, setting a frequency band that corresponds to a highest communication speed among the communication speeds detected in the first step, as a communication frequency band to be used in wireless communications that are performed to transmit and receive image data to/from the communication device; and
a third step of, with the processor, detecting communication devices that are present in a predetermined communication range, wherein
in the third step, a beacon signal is transmitted at regular time intervals to surroundings of the image processing apparatus so as to detect the communication devices that are present in the predetermined communication range;
in the first step, communication speeds that respectively correspond to the plurality of predetermined frequency bands are detected at predetermined detection time intervals, and a communication speed is not detected with respect to a communication device detected by the device detecting portion when the communication device can communicate only in one frequency band; and
in the second step, the communication frequency band is set for each of the communication devices detected in the third step, and the communication frequency band is set at the predetermined detection time intervals.

* * * * *